Dec. 17, 1940.                L. SITEK                 2,225,438
                    CONTAINER FOR FISHING RODS
                        Filed Aug. 5, 1939
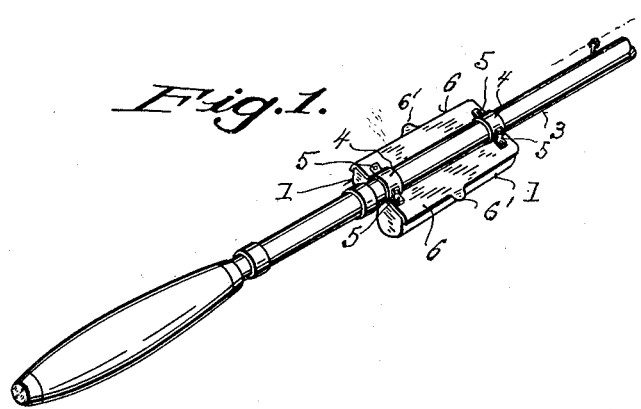
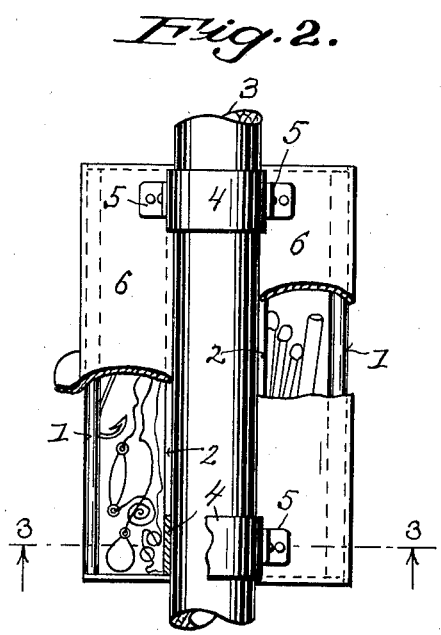
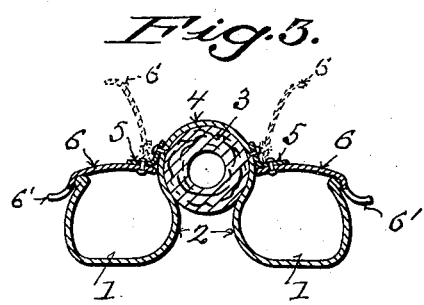
Inventor
Louis Sitek
By
Attorneys Patented Dec. 17, 1940

2,225,438

UNITED STATES PATENT OFFICE 2,225,438

CONTAINER FOR FISHING RODS

Louis Sitek, St. Francis, Wis.

Application August 5, 1939, Serial No. 288,527

1 Claim. (Cl. 43—33)

My invention has for its main object to provide a container to be positioned at the butt of a fishing rod for the purpose of carrying therein such fishing tackle as may be required from time to time, or matches, and other articles usually carried by fishermen.

The container may be built to the fishing rod in various forms, but my preferred structure embodies a pair of saddle-like containers straddling the rod, whereby they are balanced below the upper line surface of said rod to avoid entanglements. It is also possible to build in a section in the rod for having the container therein.

Another object of my invention is to provide a container of saddle-like structure to be snapped upon any type of rod at its butt.

Another object of my invention is to provide a saddle-like container having flexible or ductile straps, whereby rods of different sizes may be gripped between the compartments.

Another object of my invention is to provide a saddle-like container with spring-closed covers to insure the container being water-tight under all conditions, it being understood that the hinge elements are spring sections, whereby they will aid in effectually gripping the container to the rod when the lids are closed.

Preferably, the container is to be manufactured of light metal at a minimum cost, whereby it can be sold in an open market at a comparatively low price, and thereafter can be quickly snapped on the shank of the rod by the purchaser.

With the above and other objects in view, the invention consists in certain peculiarities of construction and arrangement of parts, as will be hereinafter fully set forth in connection with the accompanying drawing and subsequently claimed.

In the drawing:

Figure 1 illustrates a perspective view of the shank of a conventional rod having mounted thereon a container embodying the features of my invention;

Figure 2 is an enlarged plan view of the container and a fragment of the rod portion, with parts broken away and in section to better illustrate my invention; and Figure 3 is a cross section of the same, the section being indicated by line 3—3 of Figure 2.

The exemplification of my invention, as illustrated in the above-noted drawing, embodies a pair of longitudinally disposed compartments 1—1. The inner curved walls 2 of said compartments constitute a throat which is normally of lesser width than the cross sectional area of the rod 3. The walls 2, as shown, are connected by a pair of semi-circular straps 4, which, in this instance, constitute a part of said inner walls, and these straps are of sufficient elasticity to permit contraction or expansion with relation to the compartments of the container.

Secured to the straps 4 are leaf-spring hinges 5—5, which hinges also carry covers 6—6 for the mouth of the container compartments, and said cover members may be formed with ears 6' to facilitate raising the lids when it is desired to have access to either one of the compartments.

Obviously, as best shown in Figure 3 of the drawing, when the container is fitted to the rod 3, it is pushed down upon said rod at the restricted throat portion of the compartment walls; and when the rod is engaged by the straps 4, the spring in the metal will cause said container to tightly grip said rod and will thus prevent displacement of the proper position of the container, it being understood that the straps and other rod engaging parts of the container may be formed of rubber-lined gripping surfaces.

Furthermore, it is emphasized that the double-container is stamped up from a single piece of metal with a pair of straps for gripping the rod, and particular attention is directed to the fact that the flat leaf spring, which is riveted to the strap and cover elements, also serves as an additional spring grip tension upon the rod, due to the fact that the leaf spring, in pressing the covers down upon the containers, serves to press said containers against the rod surface, whereby the flexure of the metal itself is not depended upon solely for the gripping element.

Attention is also called to the fact that the position of the two-part saddle-like container is normally below the upper line track of the fishing equipment, whereby there is no liability of the line, running in and out, being entangled in the container parts.

While I have specifically described one particular exemplification of my invention in minute details, it is understood that such details may be varied within the scope of the claim.

Obviously, the container is adaptable for the butt of any type of fishing rod, and can be manufactured in one piece. It also can be provided with partitions in the container, whereby the articles inserted therein are kept separately.

I claim:

An attachment for fishing rods comprising, a one-piece double-compartment container adapted to straddle the rod butt, said one-piece container having a pair of spaced straps forming part of the inner walls of the container and for engaging the rod, companion cover lids for the aforesaid containers, and flat leaf springs secured to the straps and covers, the said spring hinge elements serving to hold the covers in closed position and also to exert an auxiliary spring pressure upon the aforesaid containers, whereby an auxiliary clamping tension upon the rod is had.

LOUIS SITEK.